United States Patent [19]

Iida

[11] Patent Number: 4,462,070

[45] Date of Patent: Jul. 24, 1984

[54] DC-DC CONVERTER PROVIDED WITH AN AC LINK

[75] Inventor: Katsuji Iida, Atsugi, Japan

[73] Assignee: Toyo Denki Seizo Kabushiki Kaisha, Tokyo, Japan

[21] Appl. No.: 386,942

[22] Filed: Jun. 10, 1982

[30] Foreign Application Priority Data

Jan. 29, 1982 [JP] Japan .................................. 57-11684
Jan. 29, 1982 [JP] Japan .................................. 57-11685

[51] Int. Cl.³ ............................................. H02D 13/18
[52] U.S. Cl. ....................................... 363/28; 363/61; 363/65; 363/136
[58] Field of Search ...................... 363/27, 28, 29, 59, 363/60, 61, 62, 65, 68, 71, 101, 135, 136

Primary Examiner—William M. Shoop
Assistant Examiner—Anita M. Ault
Attorney, Agent, or Firm—Silverman, Cass & Singer, Ltd.

[57] ABSTRACT

A DC-DC converter that has an AC link includes an input current type inverter and an output voltage type inverter coupled together by a transformer. The negative terminal of the current type inverter is connected in series with the positive terminal of the voltage type inverter. Controlled rectifiers are used in the current type and voltage type inverters and the angle, relative to a fixed point in the AC cycle, at which the controlled rectifiers are turned on and off is varied to obtain desired converter action. A substantially smaller transformer, thus, is required.

3 Claims, 7 Drawing Figures

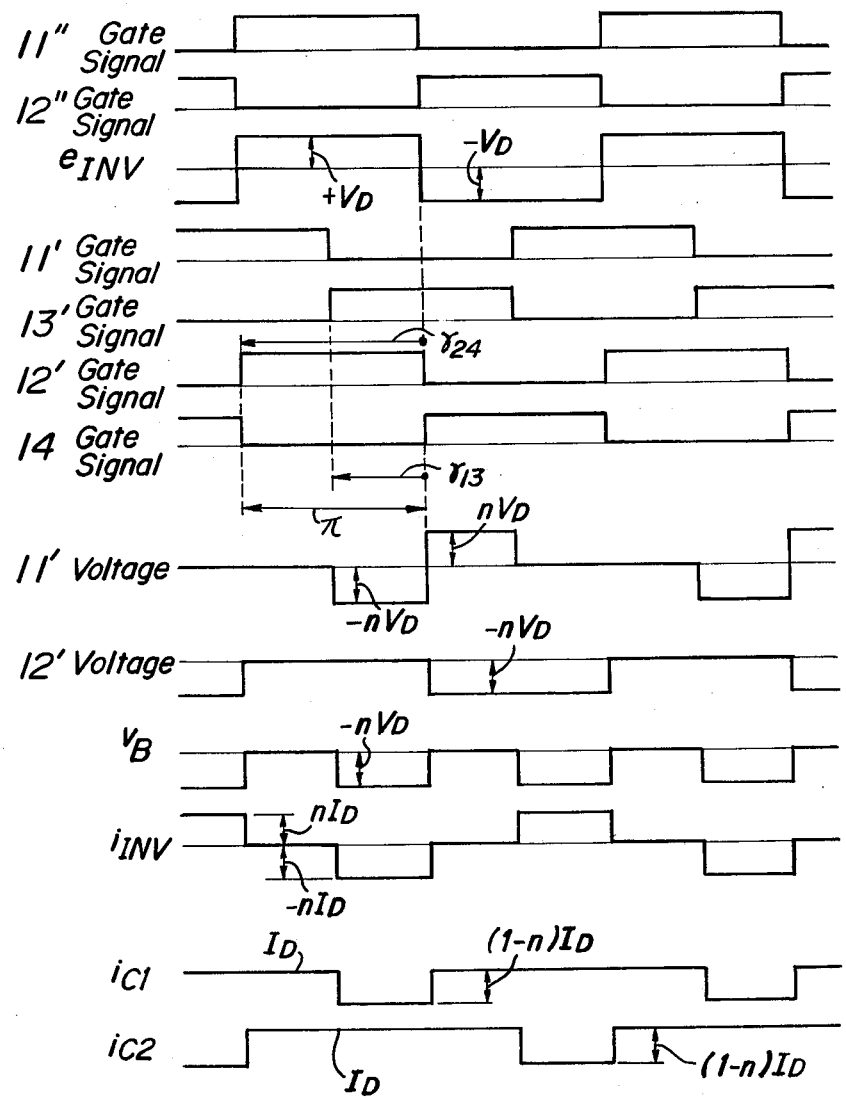

DC-DC CONVERTER PROVIDED WITH AN AC LINK

BACKGROUND OF THE INVENTION (1) Field of the Invention

The present invention relates to a DC—DC converter, and more particularly to a DC—DC converter provided with a so called AC link, in which the controlled DC current is first converted into an AC current by using an inverter and which AC current is then converted back into a DC current again.

(2) Description of the Prior Art

In the conventional DC—DC converters, various types have been used in practice. In one of such known converters, there is known a chopper type DC—DC converter incorporating a chopper circuit, which can produce a DC voltage higher than or lower than the input DC voltage. The former is known as the step-up chopper converter and the latter is known as the step-down chopper converter.

As a practical embodiment, FIG. 1a shows diagrammatically such a step-up type converter and FIG. 1b shows such a step-down type converter.

In FIGS. 1a and 1b, 1 and 1' designate controlled rectifiers, which operate to short or open responsive to an outer control signal. Example of these elements are transistors, gate turn-off (GTO) thyristors, and thyristors provided with a forced turn-off circuit. 2 and 2' are rectifiers, 3 and 3' are DC smoothing reactors, 4 and 4' are DC smoothing capacitors, $P_1$ and $N_1$ are the input terminals and $P_2$, $N_2$, $P_2'$ and $N_2'$ are the output terminals.

These types of converters are known to have the following advantages and also disadvantages.

(i) Step-up type chopper converter

This converter is effective only for the step-up of the voltage.
  (a) In a use such as an electric motor vehicle using high input DC voltage, the flexibility is very small since the DC output voltage becomes a still higher DC voltage.
  (b) Ripple current component is larger since the current fed to the smoothing capacitor flows intermittently.
  (c) The ripple in the input current can be made comparatively small.

(ii) Step-down type chopper converter

This converter is effective only for the step-down of the voltage. By this reason it has following features.
  (a) In case of the electric vehicle having a wide fluctuation range of the input voltage, the flexibility or applicability is small since the output voltage must be selected less than the minimum value of the input voltage.
  (b) The current flowing through the smoothing reactor 3' is comparatively larger compared with the step-up type so that the weight and size of the smoothing reactor portion is larger than the other type.
  (c) The ripple current is large since the input current passed by the chopper is intermittent and this affect for the input current supply source.

Furthermore, one example of a conventional DC—DC converter having inverter portions and provided with an AC link intermediary in which AC current flows, is shown in FIG. 2 and this embodiment will be explained hereinafter.

FIG. 2 shows such a conventional DC—DC converter provided with an AC link. In FIG. 2, elements 11, 12, 13 and 14 are controlled rectifiers having the same function as the elements 1 and 1' shown in FIGS. 1a and 1b. Then, elements 21, 22, 23, 24, 25, 26, 27 and 28 are rectifiers. Elements 31 and 41 are the smoothing reactor and the smoothing capacitor. The circuit is divided into 2 parts which are coupled by a transformer 5. $P_{11}$ and $N_{11}$ designate DC input terminals, $AC_1$, $AC_2$, $AC_3$ and $AC_4$ are AC terminals and $P_{21}$ and $N_{21}$ designate DC output terminals.

This device itself is a well known one so that a detailed explanation is omitted. But the operation is explained just briefly.

From a circuit shown left side and including the controlled rectifiers 11 to 14 and the rectifiers 21 to 24, a voltage type single phase bridge inverter is formed, which inverter controls the AC output voltage by pulse width modulation when the voltage is to be controlled. This AC output voltage is transformed by the transformer 5 and converted into a DC voltage by a rectifier circuit formed from rectifiers 25 to 28. Thereafter this output current is smoothed by the smoothing reactor 31 and the smoothing capacitor 41 and then fed to output $P_{21}$ and $N_{21}$ as a DC voltage.

Such a conventional DC—DC converter provided with an AC link has the following advantages and disadvantages.
  (i) By the step-up and step-down action of the transformer 5 provided intermediary to couple both circuits, the output voltage can freely be chosen.
  (ii) Compared with an older system in which the output DC voltage is controlled, the DC output voltage obtained by rectification of the AC output produced by the pulse width modulation flows intermittently so that the smoothing reactor 31 and the smoothing capacitor 41 are inevitable. This affects the input source so that the input current flows also intermittently and thus the ripple current is large.
  (iii) The capacity of the transformer 5 should match the capacity of the output load.

SUMMARY OF THE INVENTION

The present invention has been obtained by studying the aforementioned various conventional systems. The present invention is to realize a novel DC—DC converter provided with an AC link, in which only the merits of the aforementioned various systems are incorporated.

BRIEF DESCRIPTION OF THE DRAWINGS

FIGS. 4, 5 and 6 are diagrams illustrating waveforms of the control input signal and voltage and current waveforms at various portions of the device shown in FIG. 3 for explaining the control and operation thereof.

DESCRIPTION OF THE PREFERRED EMBODIMENT

The invention will now be explained by referring to the accompanying drawings.

Figure 3:
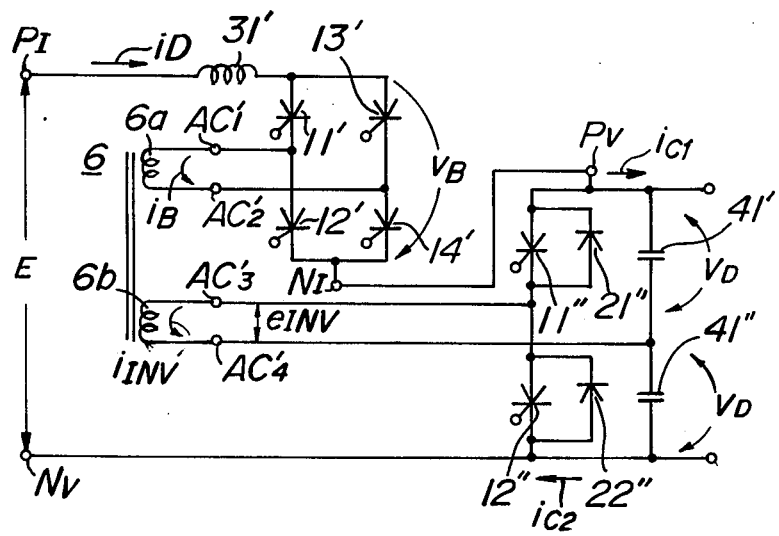
FIG. 3 is a circuit diagram of one embodiment of the converter according to the present invention showing only the essential part thereof.

FIG. 3 shows the essential portion of the circuit diagram of one embodiment of the converter made according to the present invention.

In this circuit, a single phase current type inverter is formed as shown on the left top side by a circuit including a smoothing reactor 31' and controlled rectifiers 11', 12', 13' and 14'. Further, a single phase half bridge voltage type inverter is formed as shown on the right side by controlled rectifiers 11" and 12", feedback rectifiers 21" and 22" (hereinafter called simply as rectifiers) connected in opposite parallel thereto, and smoothing capacitors 41' and 41" connected in series.

Figure 1A:
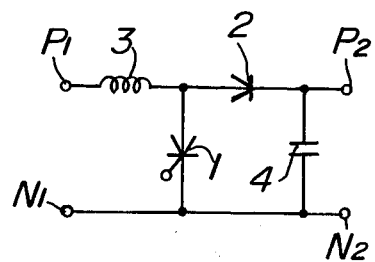
FIG. 1a and FIG. 1b are simplified circuit diagrams of two DC—DC chopper converters of the conventional type, which have been explained above.
Figure 1B:
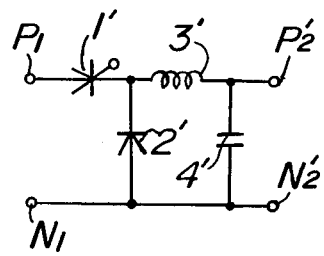
Figure 2:
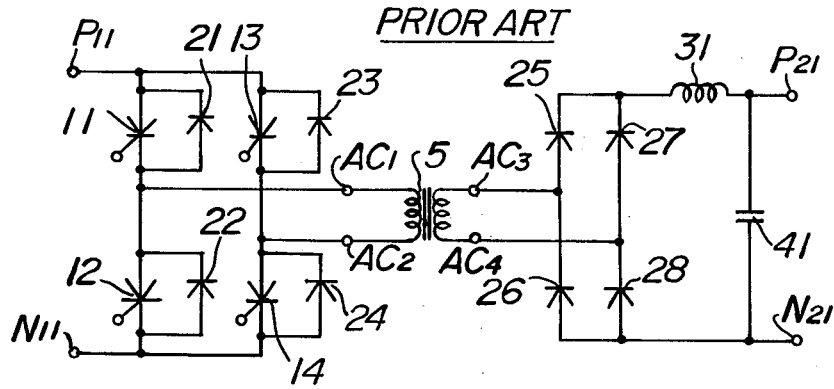
FIG. 2 is a circuit diagram of a DC—DC converter provided with an AC link intermediary of the conventional type, which also had been explained in the foregoing.

The single phase current type inverter has the positive terminal $P_I$ and the negative terminal $N_I$. The single phase half bridge voltage type inverter has the positive terminal $P_V$ and the negative terminal $N_V$. The negative terminal $N_I$ of the former is connected in series with the positive terminal $P_V$ of the latter. AC terminals $AC_1'$, $AC_2'$, and $AC_3'$, $AC_4'$ of these two inverters are coupled together through a transformer 6. In this circuit, the current type inverter and the voltage type inverter are both known per se so that a detailed explanation of their construction is omitted. The controlled rectifier elements (11'-14' 11", 12") may be the same elements as those shown in FIGS. 1a, 1b and 2.

Figure 4:
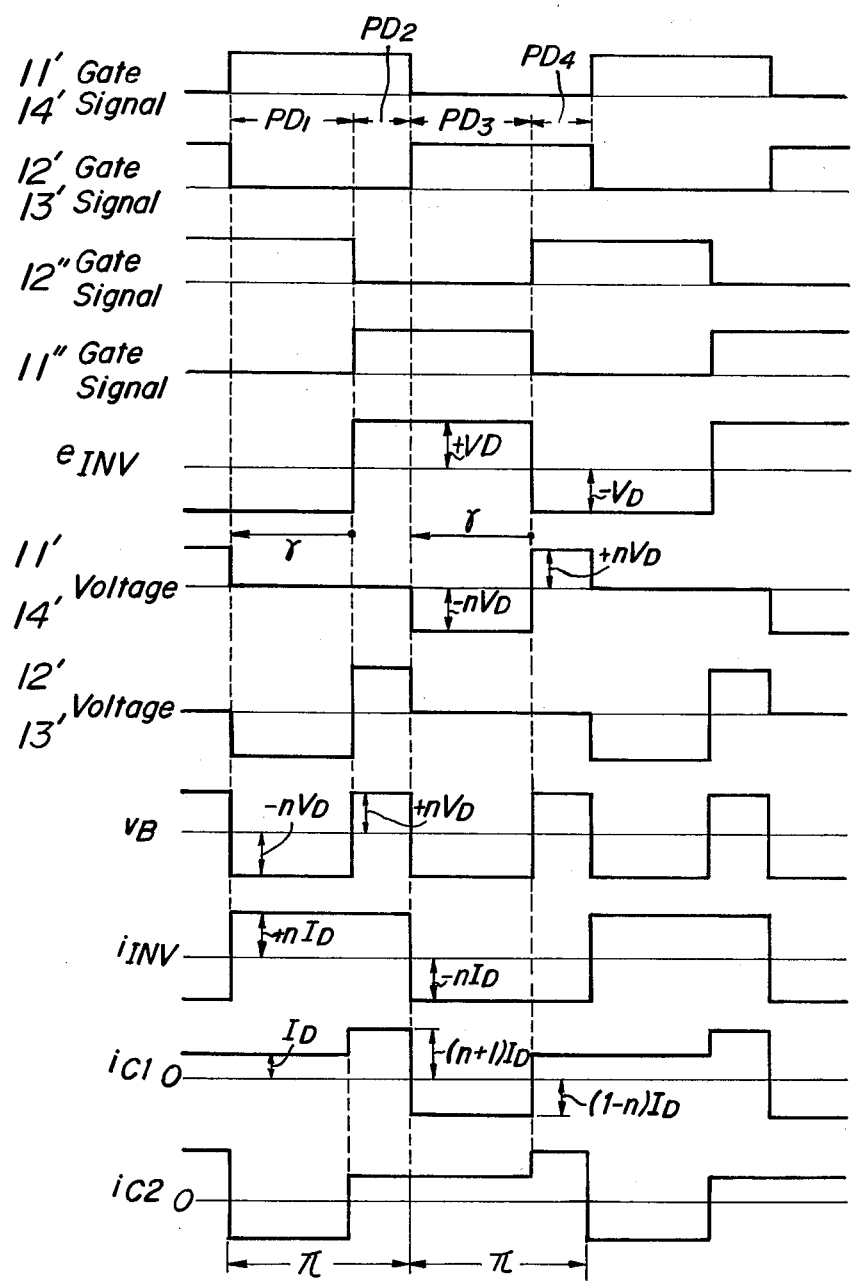

The operation of this embodiment of the invention will be described be referring to the diagram of FIG. 4 showing the input signal and waveforms of various portions.

When we assume the DC output voltage at the DC output terminals of the voltage type inverter as $2V_D$, the AC output voltage $e_{INV}$ of the transformer 6 fed from the voltage type inverter is determinantly decided by the controlled rectifiers 11" and 12" and is a rectangular waveform having the wave height $V_D$. This waveform is shown on the 5th line of FIG. 4. When we assume the turn ratio of the transformer 6 as $6a:6b = n:1$ ($6a$:number of turns at the side of the current type inverter; $6b$: number of turns at the side of voltage type inverter), a rectangular waveform having the wave height $nV_D$ should be derived at the AC terminals $AC_1'$, $AC_2'$ of the current type inverter.

Herein, the controlled rectifiers 11' and 14' are so adjusted as to turn on at a time advanced by a controlled angle $\gamma$ from a standard point at which the AC output voltage $e_{INV}$ changes its polarity from negative to positive. The controlled rectifiers 12' and 13' are so adjusted as to turn on at a time advanced by a controlled angle $\gamma$ from a standard point at which AC output voltage changes its polarity from positive to negative.

During a first period $PD_1$, due to turning on of the controlled rectifiers 11' and 14', the DC voltage $v_B$ across the DC stage of the current type inverter is $(-nV_D)$ and during the succeeding period $PD_2$, due to the reversed polarity of said DC output voltage $e_{INV}$, the DC voltage $v_B$ becomes $(+nV_D)$, as shown in the 8th line of FIG. 4.

In the next period $PD_3$, by the turning on of the controlled rectifiers 12' and 13', the DC voltage $v_B$ is $(-nV_D)$, and in the further succeeding period $PD_4$, $v_B$ is $(+nV_D)$ by the reversed polarity of $e_{INV}$. By these periods $PD_1$, $PD_2$, $PD_3$ and $PD_4$, one complete operating cycle is formed. The changing of the DC voltage is as illustrated in line $v_B$ of FIG. 4.

When an average value of the DC voltage $v_B$ plus the DC terminal voltage $2V_D$ is equal to an input voltage E fed from the DC source (not shown) to be converted, the converter operation is in equilibrium. In this case the following equation (1) establishes.

$$\left. \begin{array}{l} E = \dfrac{(\pi - \gamma) \cdot nV_D - nV_D \cdot \gamma}{\pi} + 2V_D \\[2mm] 2V_D = \dfrac{E}{1 + n \cdot \left( \dfrac{1}{2} - \dfrac{\gamma}{\pi} \right)} \end{array} \right\} \quad (1)$$

Accordingly, the voltage $2V_D$, namely the output DC voltage of the voltage type inverter forming the output of the DC—DC converter is determined by the control angle $\gamma$. Therefore, it may be understood that by controlling this control angle $\gamma$ with respect to the variation of the input voltage E, the output voltage $2V_D$ of the DC—DC converter can be made constant.

As for the voltage of the controlled rectifiers 11' and 14', these rectifiers are turned on during the periods of $PD_1$ and $PD_2$ so that the voltage across these rectifiers assumes a zero value. In a period of $PD_3$, the controlled rectifiers 12' and 13' are tunred on and by this, a reverse voltage of $(-nV_D)$ is applied to the rectifiers 11' and 14'. In the next period of $PD_4$, by the reversing of polarity of the AC output voltage, a forward voltage of $(+nV_D)$ is applied thereto. The same is applied to the controlled rectifiers 12' and 13' and the voltage is as shown on the next line. Accordingly, in such an advanced control system, because of the assured application of reverse voltage in the periods of $PD_2$ and $PD_3$, and because the reversed current can be controlled without providing a forced reverse current circuit portion even normal thyristors are used for the controlled rectifiers.

Then the relation of powers will be considered in the circuit diagram of FIG. 3. A current $i_{INV}$ flowing through the winding 6b of the transformer 6 of the voltage type inverter is shown in the 9th line of FIG. 4. This value is determined by a value $I_D$ of the input current $i_D$. From this, the flowing-in currents $i_{C1}$ and $i_{C2}$ in the smoothing capacitors 41' and 41" from the source are as shown in last 2 lines. The average value of the current in said smoothing capacitors 41' and 41" should be zero. This means that the average value $I_C$ of the two currents $i_{C1}$ and $i_{C2}$ constitutes the DC output current forming the load current. Accordingly, the average value $I_C$ is expressed in the following equation (2).

$$I_C = \dfrac{(1 - n)I_D \cdot \gamma + \pi I_D + (n + 1)I_D \cdot (\pi - \gamma)}{2\pi} = \quad (2)$$

$$\left\{ 1 + n\left( \dfrac{1}{2} - \dfrac{\gamma}{\pi} \right) \right\} I_D$$

From the above equations (1) and (2), the following is derived.

$$E \cdot I_D = 2V_D \cdot I_C \quad (3)$$

From this, it should be noted that the power $P_L(2V_D \cdot I_C)$ to be fed to the load is equal to the input power $P_D(E \cdot I_D)$. Further when we consider for an apparent power $P_T$ of the transformer 6, the apparent power $P_T=(V_D \cdot nI_D)$ and from equation (1), the following equation (4) is derived.

$$P_T = \frac{n}{2\left\{1+n\left(\frac{1}{2}-\frac{\gamma}{\pi}\right)\right\}} \cdot E \cdot I_D = \frac{n}{2\left\{1+n\left(\frac{1}{2}-\frac{\gamma}{\pi}\right)\right\}} \cdot P_D \quad (4)$$

When we assume a case in which the DC output voltage $2V_D$ should be controlled at a constant value, the maximum value $E_{max}$ and the minimum value $E_{min}$ of the controllable input voltage are as follows.

$$\left. \begin{array}{l} E_{max} = 2V_D\left(1+\frac{n}{2}\right) \\ E_{min} = 2V_D\left(1-\frac{n}{2}\right) \end{array} \right\} \quad (5)$$

When we assume;
$2V_D = 1,200$ (volt)
$E_{max} = 1,800$ (volt)
From the equation (5) it is given as:
$N=1$
Namely $E_{min}$ is as follows.
$E_{min} = 600$ (volt)
This is considered also by the fact that when we assume the rating value of the input voltage E as 1,200 volt, the control angle $\gamma$ is given as $(\gamma = \pi/2)$ from the equation (1) and the apparent power $P_T$ of the transformer 6 is expressed by $(P_T = P_D/2)$ from the equation (4). This means that the required capacity of the transformer 6 is the half of the load power.

As has been explained above, in the embodiment of the invention, the input current is continuous. The ripple can be suppressed at a small value and an output power having the voltage stepped up or stepped down with respect to the input voltage can be obtained. The transformer can be minimized substantially.

Next, a manner by which the above explained device can further be reduced, in the capacity of the transformer and in the capacity of the voltage type inverter, will be explained by referring to FIGS. 5 and 6.

Figure 5:
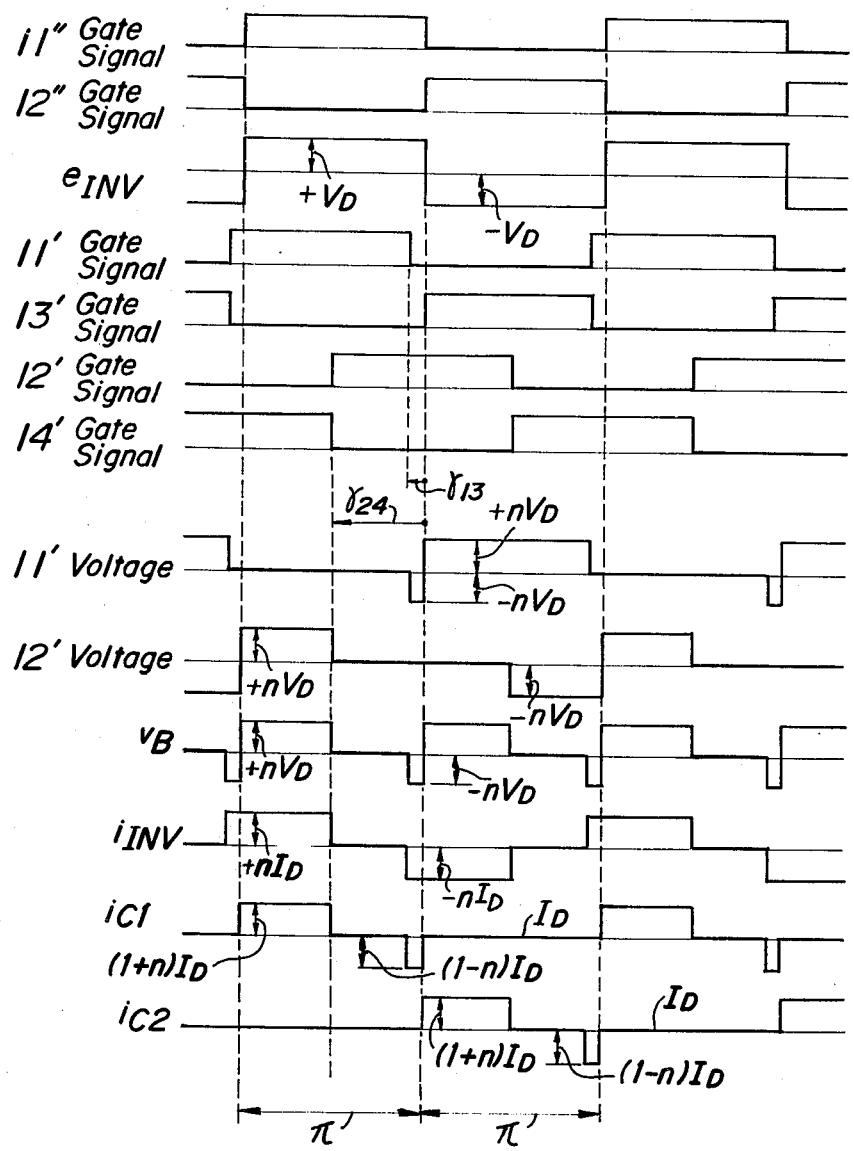

Referring to the operative chart shown in FIG. 5, at first we consider a case of obtaining a DC output voltage by stepping down from an input DC voltage. In this case, the controlled rectifiers 11' and 13' are controlled with a fixed sufficiently small advanced control angle $\gamma_{13}$ against the AC output voltage as shown in the diagram. Whereas, the controlled rectifiers 12' and 14' are controlled at a large advanced angle $\gamma_{24}$ with respect to the AC voltage. Wherein the advanced control angle $\gamma_{13}$ is so arranged that during this period, by applying a reverse voltage to the controlled rectifiers 11' and 13', it is able to turn off these controlled rectifiers, in case the current type inverter is an AC line voltage communication system. The relation between the input and output voltages is given by the following equation (6).

$$\left. \begin{array}{l} E = \frac{(\pi - \gamma_{24}) \cdot nV_D - \gamma_{13} \cdot nV_D}{\pi} + 2V_D \\ 2V_D = \frac{E}{1+n\left(\frac{1}{2} - \frac{\gamma_{13}+\gamma_{24}}{2\pi}\right)} \end{array} \right\} \quad (6)$$

In the case of stepping-up the output voltage, the advanced control angle $\gamma_{24}$ of the controlled rectifiers 12' and 14' is fixed at $\pi$, whereas the advanced control angle $\gamma_{13}$ of the controlled rectifiers 11' and 13' is controlled. The waveforms for this case corresponding to FIG. 5 is shown in FIG. 6. The voltage relationship of the input anD output is represented by the equation (6), when we assume $(\gamma_{24}=\pi)$.

The waveforms shown in FIGS. 5 and 6 have the identical variation range for the input voltage with that shown in FIG. 4, but the difference is that the current flowing through the voltage type inverter winding 6b of the transformer 6 assumes value zero over a period in which both the pair of controlled rectifiers 11' and 12' and the pair of 13' and 14' are turned-on. This period corresponds to a condition that the DC voltage of the current type inverter is short circuited.

Accordingly, a device based on such a controlling practice has a remarkable feature in that almost no current flows in the winding 6b of the voltage type inverter, provided that the advanced control angle $\gamma_{13}$ is a sufficiently small value, and that the rating value of the input voltage E is equal to the output voltage $2V_D$, i.e. $(\gamma_{13}+\gamma_{24}=\pi)$ from the equation (6).

In usual case, if the period during which the input voltage E varies greatly is very short, the transformer 6 may be a short time rating one and thus a considerably small transformer can be used. Furthermore the current flowing through the voltage type inverter is also small, and this contributes to the miniaturization and the circuit loss is also kept small. Another merit is that the ripple voltage of the DC voltage $V_B$ of the current type inverter can be made small which further contributes from the miniaturization of the smoothing reactor 31' and other associated devices.

It is apparent that by selecting the operating frequency of the voltage type inverter and the current type inverter higher than the ordinary commercial frequency (50 Hz or 60 Hz), the transformer and the reactors may further be reduced for the size.

The abovementioned embodiment is a case in which a half bridge is used for the voltage type inverter. But it is apparent that a single phase full bridge inverter can be applied therefor. The order of connection of DC terminals may be opposite from the case shown in the figure. The operation is entirely the same. The position of insertion of the smoothing reactor is not limited to a case shown in FIG. 3. It may be inserted at any portion in the series circuit portion.

As has been explained in the foregoing, the present invention utilizes the various merits of conventional systems by combining a current type inverter and a voltage type inverter and a novel and useful converter system is realized.

What is claimed is:
1. A DC—DC converter provided with an AC link comprising an AC line voltage commutation excitation current type inverter having a smoothing reactor and a number of controlled rectifiers, and a voltage type inverter having a number of controlled rectifiers, feedback rectifiers for said controlled rectifiers and smoothing capacitors connected between DC terminals of the voltage type inverter, the improvement lies in that DC terminals of said AC line voltage commutation excitation current type inverter and DC terminals of said voltage type inverter are connected in series, and that respective AC terminals of these inverters are coupled via a transformer.

2. A DC—DC converter provided with an AC link as claimed in claim 1, wherein said AC line voltage commutation excitation current type inverter is formed as a single phase full bridge current type inverter having a parallel combination of two sets of two series connected controlled rectifiers, and said two sets of two series connected controlled rectifiers being controlled so that the rectifiers in each set of the series connection conduct simultaneously in each half cycle during a certain period and that the conduction occurs alternately in the two sets.

3. A DC—DC converter provided with an AC link as claimed in claim 1, wherein the voltage type inverter is a half bridge voltage inverter comprising two sets of series combined elements connected in parallel, in which one set is the series connection of a first controlled rectifier and a first feedback rectifier parallely connected in reverse polarity and a second controlled rectifier and a second feedback rectifier parallely connected in reverse polarity; and the other set is two smoothing capacitors connected in series, there being a winding of a transformer connected between the series connection points of said two sets of series connections.

* * * * *